April 1, 1930.　　A. BOCHNAK　　1,752,324
AUTOMATIC RIFLE
Filed May 6, 1929　　2 Sheets-Sheet 1
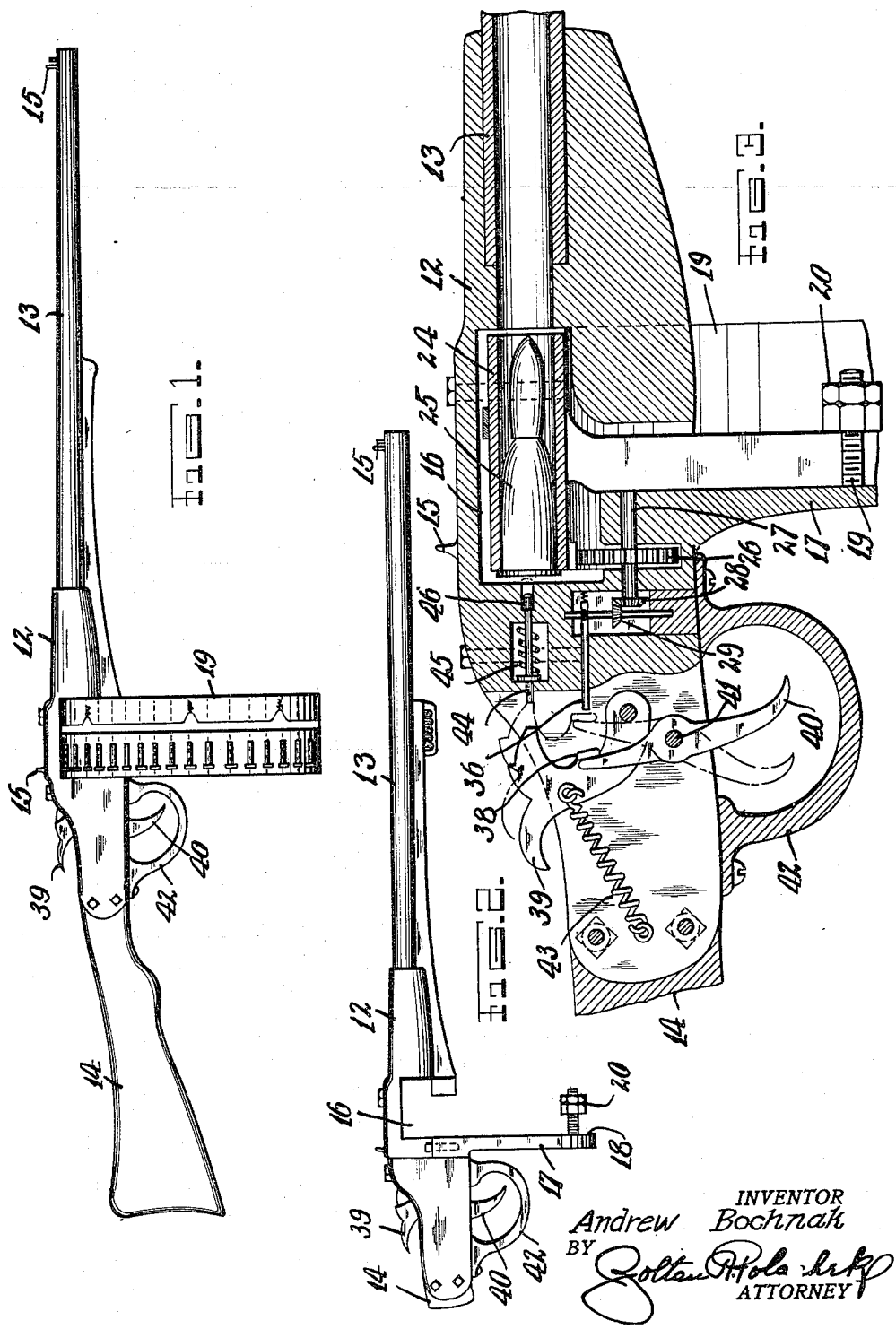

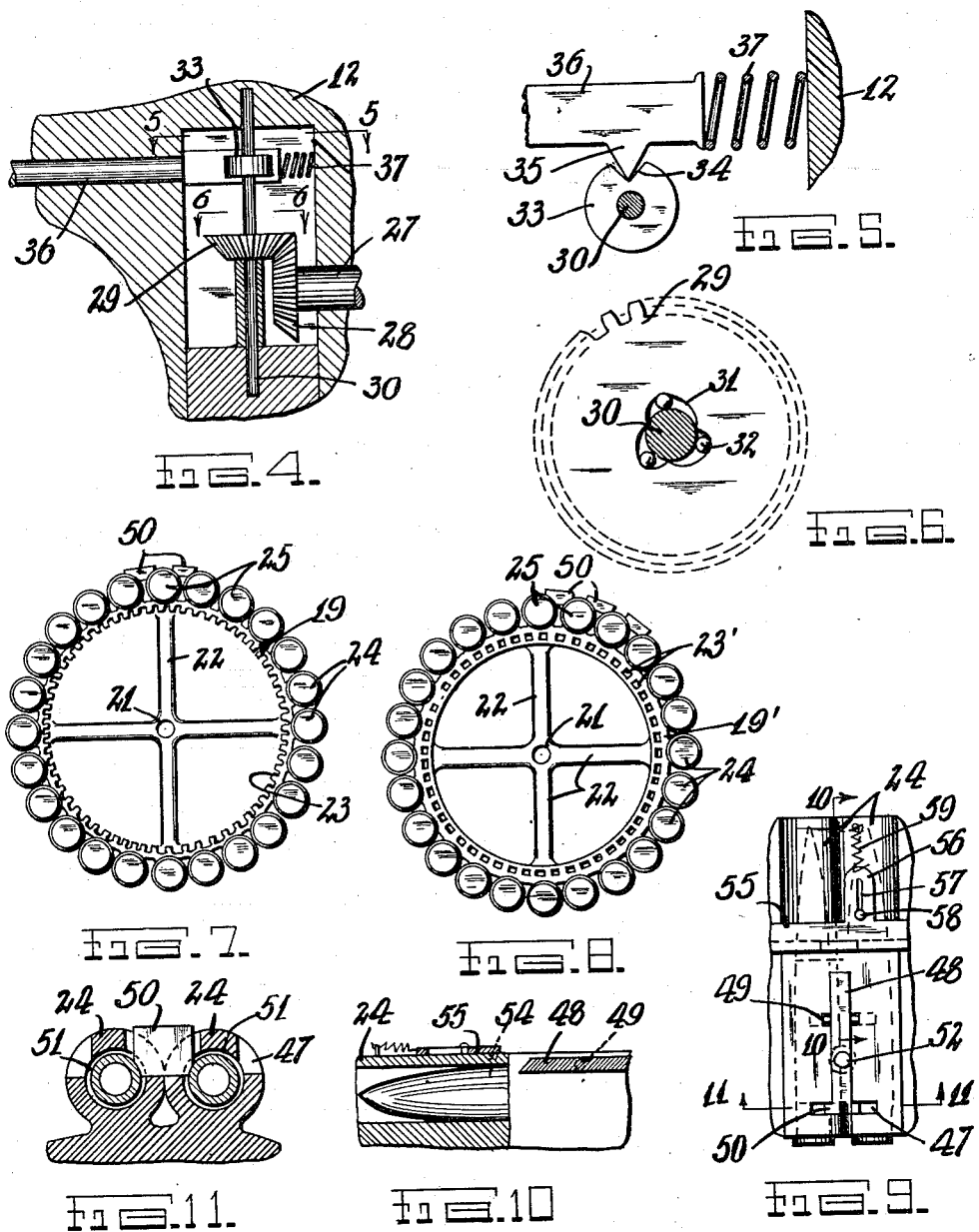

Patented Apr. 1, 1930

1,752,324

UNITED STATES PATENT OFFICE

ANDREW BOCHNAK, OF BOBTOWN, PENNSYLVANIA

AUTOMATIC RIFLE

Application filed May 6, 1929. Serial No. 360,874.

This invention relates to new and useful improvements in rifles and has particular reference to automatic rifles.

The invention has for an object the provision of a device of the class mentioned which is of simple durable construction, dependable in use and efficient in action, and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 is a side elevational view of a rifle constructed according to this invention.

Fig. 2 is a fragmentary side elevational view of the rifle shown in Fig. 1 with the cartridge wheel removed.

Fig. 3 is an enlarged detailed sectional view of a portion of the rifle shown in Fig. 1.

Fig. 4 is an enlarged detail view of a portion of Fig. 3.

Fig. 5 is a fragmentary horizontal sectional view taken on the line 5—5 of Fig. 4.

Fig. 6 is a horizontal sectional view taken on the line 6—6 of Fig. 4.

Fig. 7 is a side elevational view of the cartridge wheel, per se.

Fig. 8 is a similar view of a cartridge wheel constructed according to the modified form.

Fig. 9 is a fragmentary plan view of the cartridge wheel shown in Figs. 7 and 8.

Fig. 10 is a fragmentary sectional view taken on the line 10—10 of Fig. 9.

Fig. 11 is a sectional view taken on the line 11—11 of Fig. 9.

The reference numeral 12 indicates generally the central casing of a rifle having a barrel 13 connected with the fronts of the casing and a stock 14 connected with its rear. Sights 15 are mounted upon the central casing and the barrel for aiding in the aiming of the rifle. The central casing 12 is formed with a cartridge wheel passage 16 and with a depending arm 17. A shaft 18 projects from the arm 17 and rotatively supports a cartridge wheel 19 for passage thru the opening 16. A lock nut 20 holds the cartridge wheel against displacement.

The cartridge wheel 19 illustrated in Fig. 7 consists of a hub portion 21, spokes 22 and a rim with internal gear teeth 23. A plurality of cartridge chambers 24 are mounted upon the periphery of the rim. Cartridges 25 are shown engaged within each of the cartridge chambers. The cartridge wheel 19' illustrated in Fig. 8 is similar to the one shown in Fig. 7 but differs in that spur gear teeth 23' are arranged on the rim thereof in lieu of the internal gear teeth 23.

A gear 26 is supported upon a shaft 27 rotatively mounted in the central casing 12, and gear 26 is arranged to mesh with the internal gear teeth 19 of the cartridge wheel.

When the gun is constructed with the cartridge wheel illustrated in Fig. 8 the gear 26 is arranged to mesh with the spur gear teeth 23'. A bevel pinion 28 is fixed upon the shaft 27 and meshes with a second bevel pinion 29 arranged on a shaft 30 so as to transmit rotation in one direction only. For this purpose the gear 29 is formed with several curved recesses 31 and rollers 32 engage in these recesses. A disk 33 is fixed upon the shaft 30 and has a peripheral recess 34 engageable by a tooth 35 of a plunger 36 normally urged outwards by an expansion spring 37.

A lug 38 upon a cartridge hammer 39 is engageable against the outer end of the plunger 36 for moving the plunger inwards each time the trigger 40 is operated. The inner motion of the plunger is communicated to the gear 26 for moving the cartridge holder to align a new cartridge 25 with the barrel 13. Trigger 40 is pivotally mounted as at 41 and the bottom end is protected against accidental motion by a guard 42, the top end acts against the lug 38. The hammer 39 is normally held in an opened position by a spring 43. Aligned with the firing position with the hammer 39 is a firing pin 44 normally held in an inoperative position by an expansion spring 45 and being provided with a head 46 engageable against the rear of the bullet 25 for discharging the same.

Each of the cartridge chambers 24 is formed with lateral openings 47. Catch levers 48 are pivotally mounted as at 49 between adjacent cartridge chambers and are provided with enlarged heads 50 engageable thru the openings 47 and into grooves 51 formed in the cartridges 25 for holding the cartridges against accidental displacement. Tension springs 52 normally urge the catch levers into engaged positions. The tail of each of the catch levers is formed with an inclined rear edge 53 engageable by cam lugs 54 projecting from a ring 55 slidably mounted upon the cartridge chambers. This ring is provided with rear projections 56 formed with elongated slots 57 engaged by pins 58 to limit the slidable movements of the ring. Springs 59 normally urge the ring into an operative position.

The ring 55 may be manually moved against the action of the spring 59 so that the cam lugs 54 act against the inclined edges 53 of the catch levers for simultaneously raising the heads 50 out of engagement with the slots 51 of the cartridges. This permits a removal of the cartridges and replacement with new ones. When the ring 55 is released it automatically moves to its inoperative position and springs 52 move the heads 50 of the catch levers into their engaging positions.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a rifle of the class described, a central casing with a cartridge wheel passage, an arm depending from the casing, a cartridge wheel mounted on the arm and formed with gear teeth, and means including the gear teeth for advancing the cartridge wheel a cartridge distance upon operation of a trigger of the rifle, said cartridge wheel being provided with means for holding cartridges against accidental displacement, including pivoted levers engageable with the cartridges.

2. In a rifle of the class described, a central casing with a cartridge wheel passage, an arm depending from the casing, a cartridge wheel mounted on the arm and formed with gear teeth, and means including the gear teeth for advancing the cartridge wheel a cartridge distance upon operation of a trigger of the rifle, said cartridge wheel being provided with means for holding cartridges against accidental displacement, including pivoted levers engageable with the cartridges, and means for unitarily moving the levers into inoperative positions.

3. In a rifle of the class described, a central casing with a cartridge wheel passage, an arm depending from the casing, a cartridge wheel mounted on the arm and formed with gear teeth, and means including the gear teeth for advancing the cartridge wheel a cartridge distance upon operation of a trigger of the rifle, said cartridge wheel being provided with means for holding cartridges against accidental displacement, including pivoted levers engageable with the cartridges, and means for unitarily moving the levers into inoperative positions, consisting of a ring with cam lugs actuable against inclined ends on the levers.

In testimony whereof I have affixed my signature.

ANDY BOCHNAK.